United States Patent
Egberg et al.

(10) Patent No.: US 9,759,560 B2
(45) Date of Patent: Sep. 12, 2017

(54) FAULT ISOLATING ALTITUDE SPLITS

(71) Applicant: Rosemount Aerospace Inc., Burnsville, MN (US)

(72) Inventors: James B. Egberg, St. Paul, MN (US); Scott J. Braun, Lakeville, MN (US); Brian D. Matheis, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 31 days.

(21) Appl. No.: 14/737,173

(22) Filed: Jun. 11, 2015

(65) Prior Publication Data

US 2015/0369601 A1    Dec. 24, 2015

Related U.S. Application Data

(60) Provisional application No. 62/014,380, filed on Jun. 19, 2014.

(51) Int. Cl.
*G01C 25/00*    (2006.01)
*G01C 5/00*    (2006.01)

(52) U.S. Cl.
CPC .......... *G01C 5/005* (2013.01); *G01C 25/00* (2013.01)

(58) Field of Classification Search
None
See application file for complete search history.

(56) References Cited

U.S. PATENT DOCUMENTS 6,804,600 B1    10/2004  Uluyol et al.
2012/0123704 A1*  5/2012  Golly ............... G01P 5/165
                                            702/50

FOREIGN PATENT DOCUMENTS

EP    2743706 A1    6/2014
GB    2432914 A    6/2007
WO    WO-2014037902 A1    3/2014

OTHER PUBLICATIONS

European Search Report for Application No. 15171515.8 dated Nov. 11, 2015 Rosemount Aerospace Inc.

* cited by examiner

*Primary Examiner* — Robert R Raevis
(74) *Attorney, Agent, or Firm* — Locke Lord LLP; Scott D. Wofsy; Joshua L. Jones

(57) ABSTRACT

A method of isolating a source of an altitude split in a plurality of altitude sensors includes receiving a static pressure reading from a first altitude sensor and receiving a static pressure reading from a second altitude sensor. The method also includes comparing each of the static pressure readings with an expected static pressure value to determine which of the altitude sensors is the source of a split in altitude readings of the altitude sensors.

11 Claims, 3 Drawing Sheets

FAULT ISOLATING ALTITUDE SPLITS

CROSS-REFERENCE TO RELATED APPLICATION

This application claims the benefit of priority under 35 U.S.C. §119(e) to U.S. Provisional Application No. 62/014,380, filed Jun. 19, 2014, which is incorporated herein by reference in its entirety.

BACKGROUND OF THE INVENTION

1. Field of the Invention

The present disclosure relates to sensors, and more particularly to sensor systems for use in aircraft for example.

2. Description of Related Art

Conventional altitude sensor systems for aircraft include redundant altitude sensors. It is expected that during normal operation, the altitude sensors on an aircraft will all give consistent readings for altitude. When there is a discrepancy in the altitude readings of one or more altitude sensors, this is referred to as an altitude split. One of the points of having redundant altitude sensors is to continue providing useful altitude data even when one sensor is not providing accurate data, as in the event of an altitude split. Typically after a flight in which an altitude split has occurred, it must be determined which sensor gave rise to the altitude split. Traditionally, this has meant removing two altitude sensors from the aircraft, one from each of two opposite sides of the aircraft, and troubleshooting or disassembling both to find the cause of the altitude split. After the source of the discrepancy has been addressed, the sensors can be reinstalled.

Such conventional methods and systems have generally been considered satisfactory for their intended purpose. However, there is still a need in the art for improved systems and methods for fault isolating altitude splits. The present disclosure provides a solution for this need.

SUMMARY OF THE INVENTION

A method of fault isolating an altitude split in a plurality of altitude sensors includes receiving a static pressure reading from a first altitude sensor and receiving a static pressure reading from a second altitude sensor. The method also includes comparing each of the static pressure readings with an expected static pressure value to determine which of the altitude sensors is the source of a split in altitude readings of the altitude sensors. For example, the first and second altitude sensors can be on opposite sides of an aircraft from one another.

In certain embodiments, the method includes deriving the expected static pressure value from at least one static pressure sensor separate from the altitude sensors. An average static pressure reading can be calculated for the first altitude sensor, the second altitude sensor, and at least one additional static pressure sensor. The average static pressure can be used as the expected static pressure value for comparison with the static pressure readings of each of the first and second altitude sensors. It is also contemplated that determining which of the altitude sensors is the source of the split in altitude readings can include identifying as the source of the split in altitude readings the altitude sensor with a static pressure reading farthest from the average static pressure reading. It is also contemplated that the method can include providing output indicative of which altitude sensor is the source of the split in altitude readings.

A system includes a processor operatively connected to a memory. The memory includes instructions recorded thereon that, when read by the processor, cause the processor to perform the functions described above with respect to the method.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
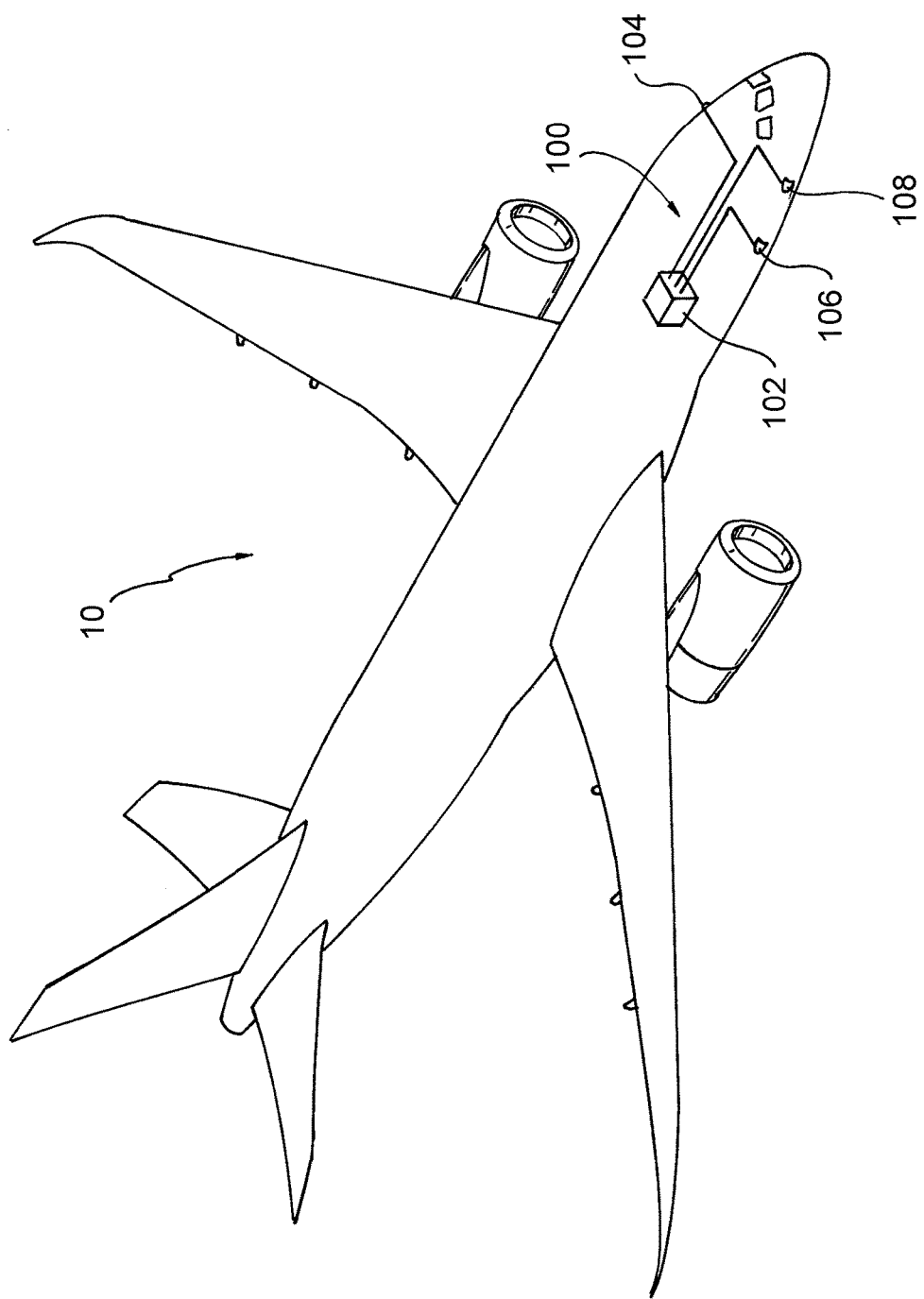
FIG. 1 is a schematic perspective view of an exemplary embodiment of an aircraft system constructed in accordance with the present disclosure, showing altitude sensors on opposite sides of the aircraft connected to an onboard data monitor.

Reference will now be made to the drawings wherein like reference numerals identify similar structural features or aspects of the subject disclosure. For purposes of explanation and illustration, and not limitation, a partial view of an exemplary embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to fault isolate the source of an altitude split.

Aircraft 10 in FIG. 1 includes system 100, which during normal use provides flight data for aircraft 10. System 100 includes a data monitor 102, for example an onboard computer, for collecting data from a plurality of sensors 104, 106, and 108. Sensors 104 and 106 are air data probes with altitude sensors, and are located on opposite sides of aircraft 10. Among other things, this provides redundancy to system 100 to help ensure altitude readings are not interrupted. Sensor 108 can be any other suitable type of sensor that provides for static pressure readings. Examples of such sensors include altitude sensors, side slip sensors, angle of attack sensors, air speeds sensors, and the like. The connections for communicating data between data monitor 102 and the sensors 104, 106, and 108 are shown schematically in FIG. 1, and can be hard wired and/or wireless.

Figure 2:
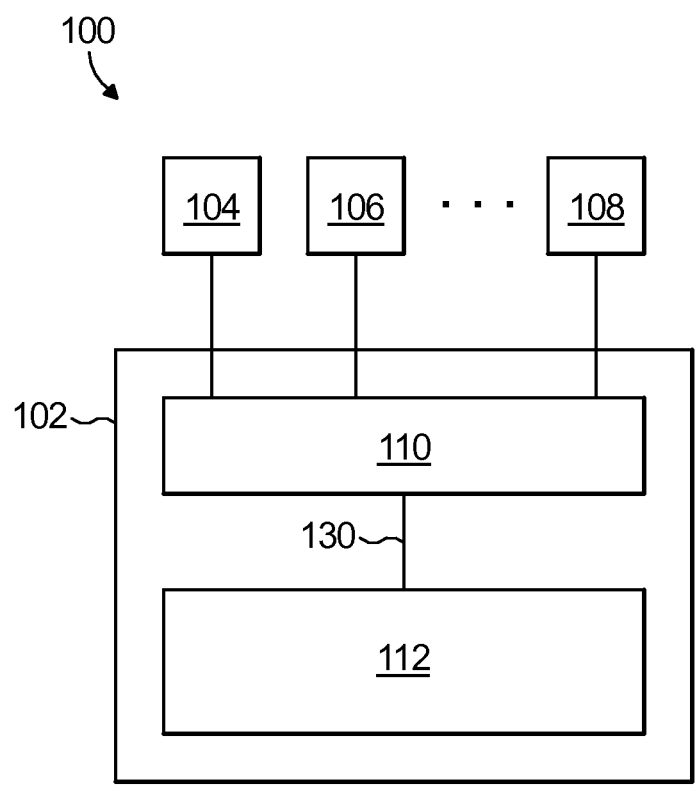
FIG. 2 is a schematic view of a portion of the system of FIG. 1, showing the processor and memory of the onboard data monitor.

Referring now to FIG. 2, data monitor 102 includes a processor 110 operatively connected to a memory 112. Processor 110 is operatively connected to the sensors 104, 106, and 108 for monitoring air data based on readings from the sensors 104, 106, and 108. The ellipses shown in FIG. 2 indicate that while three sensors 104, 106, and 108 are shown and described, any suitable number of sensors can be included. Memory 112 includes instructions recorded thereon that, when read by processor 110, cause processor 110 to perform the functions described below with respect to methods of fault isolating altitude splits.

Figure 3:
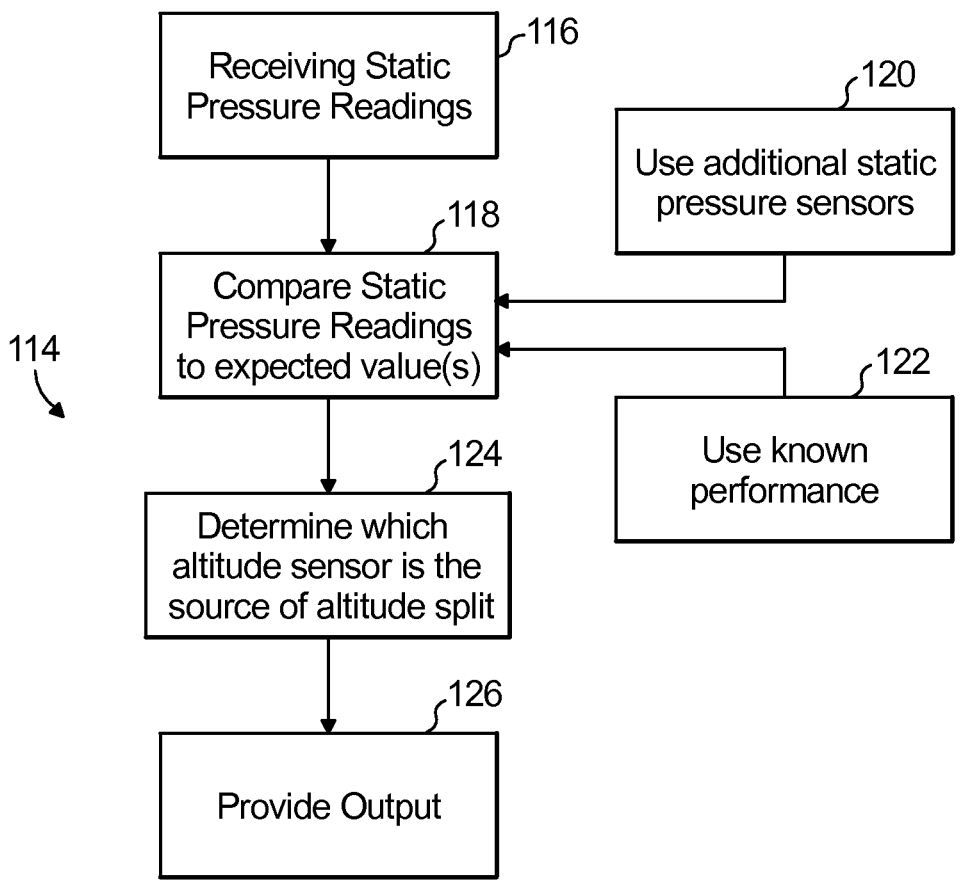
FIG. 3 is a schematic view of a method in accordance with the present disclosure, showing steps for isolating the source of an altitude split.

With reference to FIG. 3, an exemplary method 114 of fault isolating an altitude split in a plurality of altitude sensors includes, as indicated by box 116, receiving a static pressure reading from a first altitude sensor, e.g., sensor 104, and receiving a static pressure reading from a second altitude sensor, e.g., sensor 106. For example, receiving static pressure readings from the first and second altitude sensors can include receiving static pressure readings from the first and second altitude sensors wherein the first and second altitude sensors are on opposite sides of an aircraft from one another, as in sensors 104 and 106 in FIG. 1. Method 114 also includes, as indicated by box 118, comparing each of the static pressure readings with an expected static pressure value to determine which of the altitude sensors is the source of a split in altitude readings of the altitude sensors, as indicated by box 124.

The expected static pressure value can be derived from various sources. The expected static pressure can be derived, as indicated by box 120, from at least one static pressure sensor, e.g., sensor 108, that is separate from the altitude sensors. For example, if the static pressure reading in sensor 108 has not changed, but the static pressure reading in one of the sensors 104 and 106 has changed, the sensor 104 or 106 for which the static pressure reading has changed can be considered to be the source of the altitude split.

As another example, an average static pressure reading can be calculated for the first altitude sensor, e.g., sensor 104, the second altitude sensor, e.g., sensor 106, and at least one additional static pressure sensor, e.g., sensor 108. The average static pressure can be used as the expected static pressure value for comparison with the static pressure readings of each of the first and second altitude sensors. It is also contemplated that determining which of the altitude sensors is the source of the split in altitude readings can include identifying as the source of the split in altitude readings the altitude sensor with a static pressure reading farthest from the average static pressure reading. More than one additional sensor can be used to obtain the average. Moreover, if it is also contemplated that corrections or calibrations can be applied on an individual sensor basis before or in conjunction with calculating the average in order to account for expected sensor to sensor variations, e.g., each of sensors 104, 106, and 108 can have a unique expected value.

In another example, method 114 can include deriving the expected static pressure value for each of the altitude sensors from known sensor performance for each altitude sensor respectively, as indicated by box 122. For example, if flight data from all other sources indicates altitude has not changed, but an altitude split occurs between sensors 104 and 106, then whichever of sensors 104 and 106 shows a recent change in altitude reading corresponding with the timing of the altitude split can be isolated as the fault source.

It is also contemplated that method 114 can include providing output indicative of which altitude sensor is the fault source of the split in altitude readings, and/or indicative of the nature of the fault, e.g., mechanical or aerodynamic, as indicated by box 126. The output can be used, for example, by maintenance personnel to remove and inspect the sensor that is the source of fault in the altitude split. Since maintenance personnel only need to inspect the one sensor, instead of both sensors as was traditionally necessary, there is considerable savings in time and cost.

As will be appreciated by one skilled in the art, aspects of the present embodiments may be embodied as a system, method or computer program product. Accordingly, aspects of the present embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 2 is a schematic block diagram of an example of data monitor 102 that may be used (or components thereof) with one or more embodiments described herein, e.g., as a system for fault isolating altitude splits. In different embodiments this data monitor 102 are configured to communicate with other devices in any suitable way, such as, for example, via a communication network.

Data monitor 102 is intended to represent any type of computer system capable of carrying out the teachings of various embodiments of the present disclosure. Data monitor 102 is only one example of a suitable system and is not intended to suggest any limitation as to the scope of use or functionality of embodiments described herein. Regardless, data monitor 102 is capable of being implemented and/or performing any of the functionality set forth herein.

Data monitor 102 is operational with numerous other general purpose or special purpose computing system environments or configurations. Examples of well-known computing systems, environments, and/or configurations that may be suitable for use with data monitor 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Data monitor 102 may be described in the general context of computer system-executable instructions, such as program modules, being executed by a computer system. Generally, program modules may include routines, programs, objects, components, logic, data structures, and so on that perform particular tasks or implement particular abstract data types. Data monitor 102 may be practiced in distributed data processing environments where tasks are performed by remote processing devices that are linked through a communications network. In a distributed data processing environment, program modules may be located in both local and remote computer system storage media including memory storage devices.

Data monitor 102 is shown in FIG. 2 in the form of a general-purpose computing device. The components of data monitor 102 may include, but are not limited to, one or more processors 110 or processing units, a system memory 112, and a bus 130 that couples various system components including system memory 112 to processor 110.

Bus 130 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Data monitor 102 typically includes a variety of computer system readable media. Such media may be any available media that is accessible by data monitor 102, and it includes both volatile and non-volatile media, removable and non-removable media.

System memory 112 can include computer system readable media in the form of volatile memory, such as random access memory (RAM) and/or cache memory. Data monitor 102 may further include other removable/non-removable, volatile/non-volatile computer system storage media. By way of example only, a storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 130 by one or more data media interfaces. As will depicted and described herein, memory 112 may include at least one program product having a set (e.g., at least one) of program modules that are configured to carry out the functions of embodiments disclosed herein.

A program/utility, having a set (at least one) of program modules, such as described above, may be stored in memory 112 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments described herein.

Data monitor 102 may also communicate with one or more external devices such as a keyboard, a pointing device, a display, and the like; one or more devices that enable a user to interact with data monitor 102; and/or any devices (e.g., network card, modem, etc.) that enable data monitor 102 to communicate with one or more other computing devices. Such communication can occur via Input/Output (I/O) interfaces. Still yet, data monitor 102 can communicate with one or more networks such as a local area network (LAN), a general wide area network (WAN), and/or a public network (e.g., the Internet) via a network adapter. The network adapter can communicate with other components of data monitor via bus 130. It should be understood that although not shown, other hardware and/or software components could be used in conjunction with data monitor 102. Examples, include, but are not limited to: microcode, device drivers, redundant processing units, external disk drive arrays, RAID systems, tape drives, and data archival storage systems, and the like.

FIG. 2 is intended to provide a brief, general description of an illustrative and/or suitable exemplary environment in which embodiments of the above described embodiments may be implemented. FIG. 2 is exemplary of a suitable environment and is not intended to suggest any limitation as to the structure, scope of use, or functionality of an embodiment of the present disclosure. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

The methods and systems of the present disclosure, as described above and shown in the drawings, provide for fault isolating altitude splits with superior properties including the potential to render unnecessary the inspection sensors not responsible for altitude splits. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A method of fault isolating an altitude split in a plurality of altitude sensors comprising:
   receiving a static pressure reading from a first altitude sensor;
   receiving a static pressure reading from a second altitude sensor;
   comparing each of the static pressure readings with an expected static pressure value to determine which of the altitude sensors is the source of a split in altitude readings of the altitude sensors;
   providing output indicative of which altitude sensor is the source of the split; and
   inspecting only the altitude sensor that is the source of the split in altitude readings.

2. A method as recited in claim 1, further comprising:
   deriving the expected static pressure value from at least one static pressure sensor separate from the altitude sensors.

3. A method as recited in claim 2, further comprising:
   calculating an average static pressure reading from the first altitude sensor, the second altitude sensor, and the at least one additional static pressure sensor; and
   using the average static pressure as the expected static pressure value for comparison with the static pressure readings of each of the first and second altitude sensors.

4. A method as recited in claim 3, wherein determining which of the altitude sensors is the source of the split in altitude readings includes identifying as the source of the split in altitude readings the altitude sensor with a static pressure reading farthest from the average static pressure reading.

5. A method as recited in claim 1, further comprising:
   providing output indicative of which altitude sensor is the source of the split in altitude readings.

6. A method as recited in claim 1, wherein receiving static pressure readings from the first and second altitude sensors includes receiving static pressure readings from the first and second altitude sensors wherein the first and second altitude sensors are on opposite sides of an aircraft from one another.

7. A system comprising:
   a processor operatively connected to a memory, wherein the memory includes instructions recorded thereon that, when read by the processor, cause the processor to:
   receive a respective static pressure reading from each of a pair of altitude sensors for which a split in altitude readings has occurred;
   compare the respective static pressure readings of the altitude sensors with an expected static pressure value for each of the altitude sensors respectively to determine which of the altitude sensors is the source of the split in altitude readings and provide output indicative of which altitude sensor is the source of the split for inspecting only the altitude sensor that is the source of the split in altitude readings.

8. A system as recited in claim 7, wherein the memory includes instructions recorded thereon that, when read by the processor, cause the processor to:
   derive the expected static pressure value from at least one static pressure sensor separate from the altitude sensors.

9. A system as recited in claim 8, wherein the memory includes instructions recorded thereon that, when read by the processor, cause the processor to:
   calculate an average static pressure reading from the first altitude sensor, the second altitude sensor, and the at least one additional static pressure sensor; and
   use the average static pressure as the expected static pressure value for comparison with the static pressure readings of each of the first and second altitude sensors, wherein determining which of the altitude sensors is the source of the split in altitude readings includes identifying as the source of the split in altitude readings the altitude sensor with a static pressure reading farthest from the average static pressure reading.

10. A system as recited in claim 7, wherein the memory includes instructions recorded thereon that, when read by the processor, cause the processor to:
    provide output indicative of which altitude sensor is the source of the split in altitude readings.

11. A system as recited in claim 7, wherein receiving static pressure readings from the first and second altitude sensors includes receiving static pressure readings from the first and second altitude sensors wherein the first and second altitude sensors are on opposite sides of an aircraft from one another.

* * * * *